No. 711,078. Patented Oct. 14, 1902.
H. D. SHARP.
SAW FILING AND SETTING DEVICE.
(Application filed Apr. 21, 1902.)
(No Model.)
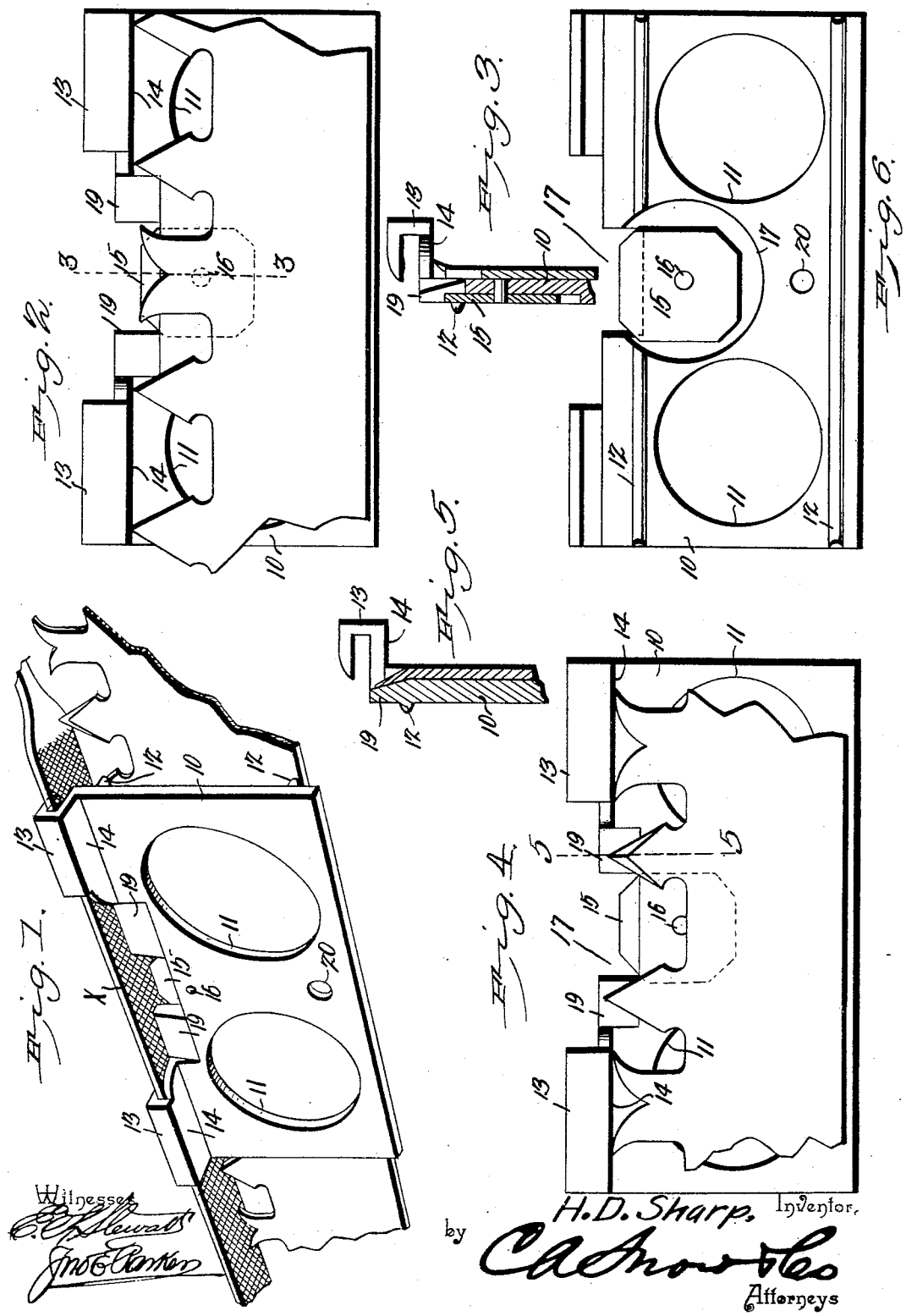

UNITED STATES PATENT OFFICE.

HERBERT D. SHARP, OF BERLIN HEIGHTS, OHIO.

SAW FILING AND SETTING DEVICE.

SPECIFICATION forming part of Letters Patent No. 711,078, dated October 14, 1902.

Application filed April 21, 1902. Serial No. 104,012. (No model.)

*To all whom it may concern:*

Be it known that I, HERBERT D. SHARP, a citizen of the United States, residing at Berlin Heights, in the county of Erie and State of Ohio, have invented a new and useful Saw Filing and Setting Device, of which the following is a specification.

My invention relates to certain improvements in devices employed for sharpening and setting the teeth of saws of that class in which drag or clearing teeth are arranged in alternation with single or with a series of cutting-teeth, and has for its principal object to construct a simple form of tool by which the points of the teeth may be arranged in proper alinement, the drag or clearing teeth arranged at proper distance from the line of cutting-teeth in accordance with the character of the work, and the cutting-teeth uniformly and evenly set throughout the length of the saw-blade.

With these and other objects in view the invention consists in the novel construction and arrangement of parts hereinafter described, illustrated in the accompanying drawings, and particularly pointed out in the appended claims.

In the drawings, Figure 1 is a perspective view of a combination-tool constructed in accordance with my invention and illustrating the same in file-holding position while the tool is being employed to place the cutting-teeth in proper alinement. Fig. 2 is a face view of the tool, illustrating its use in gaging the projection of the drag or clearing teeth. Fig. 3 is a sectional elevation of the same on the line 3 3 of Fig. 2. Fig. 4 is a view similar to Fig. 2, illustrating the tool as employed during the setting of the cutting-teeth. Fig. 5 is a sectional elevation of the same on the line 5 5 of Fig. 4. Fig. 6 is an elevation of the rear face of the tool.

Similar numerals of reference are employed to indicate corresponding parts throughout the several figures of the drawings.

The device is principally intended for use in connection with cross-cut and similar saws where clearing or drag teeth are placed at intervals throughout the length of the blade for the purpose of removing the accumulated sawdust from the kerf, and consists of a simple form of combination-tool by means of which the saw may be readily put into good condition without the employment of highly-skilled labor.

Referring to the drawings, 10 indicates a base-plate of any suitable dimensions, which may be provided with a pair of openings 11 for the purpose of decreasing the weight of the tool, as well as to form a convenient handle for manipulating the tool when the teeth are being dressed preliminary to the sharpening operation. On the inner or lower face of the plate are a pair of parallel ribs 12, adapted for contact with the saw-blade, although these may be dispensed with and the plate 10 placed closely against the side of the saw. At the top of the plate 10 are arranged a pair of recessed shoulders 13, said shoulders being disposed at points at or near the opposite ends of the plate and being adapted to receive and hold a file or similar dressing-tool *x*.

It is a well-known fact that after saws have been sharpened a number of times the teeth are uneven and as some project to a greater distance than others the cutting operation is rendered extremely difficult and irregular. To overcome this difficulty and bring all of the points of the cutting-teeth into the same line, I place the file in the recesses of the shoulders 13 and then move the tool to and fro along the saw-blade, with the file in contact with the points of the teeth, until all of the points are in the same plane. The teeth are then sharpened in the usual manner, the blunt end formed by the file on an abnormally-projecting tooth serving as a guide to the workman and insuring the proper sharpening of all of the teeth if any ordinary degree of care be exercised.

As is well known, the points of the drag-teeth do not project the same distance from the saw-blade as do the cutting-teeth, and the projection of such drag-teeth is generally governed by the character of the wood on which the saw is to be used—the harder the wood the greater the projection of the drag-teeth, and vice versa. To accurately gage the extent of projection of each of the drag-teeth, and thus secure uniformity of the teeth throughout the length of the blade, I employ an adjustable gage-plate 15, mounted on a pin 16, carried by the plate 11 at a point inwardly from the lower walls of a recess 17, formed in the upper edge of the plate 10. The gage-plate 15 is polygonal in form and is mounted eccentrically on the pin 16, its four or more gage-faces being each arranged at a different distance from the center of the pin and each representing a variation in the distance to which a drag-tooth may project.

To properly gage the extent of projection of the drag-teeth, the gage-plate 15 is turned until its then upper edge is at the required distance below the plane in which the lower faces of the shoulders 13 are situated, and the cutting-teeth of the saw are placed in contact with the faces 14 of said shoulders, the intermediate drag-teeth being positioned, as illustrated in Figs. 2 and 3, immediately in alinement with the gage-plate 15. The outer end of the drag-tooth may then be dressed down by a file until its projecting end is in the same plane with the gaging edge of the plate 15, and in similar manner all of the drag-teeth are correspondingly treated to insure uniformity of projection. If the points of the drag-teeth are to be located at a greater or less distance from the plane of the points of the cutting-teeth, the gage-plate is turned to the proper position and the operation carried on as before.

On each side of the slot or recess 17 and between the vertical walls of the slot and the inner ends of the shoulders 13 are a pair of anvils 19, the surfaces of which are disposed at a suitable angle to the plane of the plate 10, the angles of the two anvils being different in order to accommodate different kinds of saws or where the angle of set of the teeth varies. During the setting operation the tool may be secured to a suitable standard of any character by clamping it in position, and an opening 20 is formed in the plate 10 for the entrance of a pin, screw, or other fastening device.

During the setting of the saw the latter is placed in the position illustrated in Figs. 4 and 5, the drag-teeth being placed against the faces 14 of shoulders 13 and forming the gaging devices for determining the distance which the cutting-teeth shall project over the inclined face of the anvil. The teeth are set by a hammer-blow in the usual manner.

The device may be employed in connection with saws of different type, the saw illustrated in the drawings being merely used as an example of one form of saw on which the tool may be employed.

While the construction herein described, and illustrated in the accompanying drawings, is the preferred form of the device, it is obvious that various changes in the form, proportions, size, and minor details of the structure may be made without departing from the spirit or sacrificing any of the advantages of the invention.

Having thus described my invention, what I claim as new is—

1. A combination-tool for the purpose described, comprising a plate having spaced shoulders forming teeth-engaging stops, said shoulders being recessed for the reception of a dressing-file, and inclined setting-anvils forming a part of the plate and disposed at points between said shoulders.

2. A combination-tool for the purpose described, comprising a plate having at its upper edge a pair of spaced shoulders adapted to engage with the points of the teeth of a saw, said shoulders being provided with recesses for the reception and support of a file, there being a recess formed in the edge of the plate at a point midway between the two shoulders, setting-anvils forming a part of the plate and disposed between said recess and shoulders, and a revolubly-mounted gage 15 carried by the plate adjacent to the recess and adjustable to present any one of its edges to a position above the lower wall of said recess.

In testimony that I claim the foregoing as my own I have hereunto affixed my signature in the presence of two witnesses.

HERBERT D. SHARP.

Witnesses:
 HENRY HART,
 WM. H. BUDERUS.